United States Patent
Hao et al.

(10) Patent No.: US 11,246,165 B2
(45) Date of Patent: Feb. 8, 2022

(54) RANDOM ACCESS RESOURCE INDICATION METHOD, BASE STATION AND TERMINAL

(71) Applicant: ZTE CORPORATION, Guangdong (CN)

(72) Inventors: Peng Hao, Guangdong (CN); Junfeng Zhang, Guangdong (CN); Xing Liu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 94 days.

(21) Appl. No.: 16/483,463

(22) PCT Filed: Feb. 2, 2018

(86) PCT No.: PCT/CN2018/075021
§ 371 (c)(1),
(2) Date: Aug. 5, 2019

(87) PCT Pub. No.: WO2018/141260
PCT Pub. Date: Aug. 9, 2018

(65) Prior Publication Data
US 2020/0229234 A1 Jul. 16, 2020

(30) Foreign Application Priority Data
Feb. 3, 2017 (CN) .......................... 201710075279.3

(51) Int. Cl.
*H04W 74/08* (2009.01)
*H04W 72/04* (2009.01)
(52) U.S. Cl.
CPC ... *H04W 74/0833* (2013.01); *H04W 72/0486* (2013.01)
(58) Field of Classification Search
None
See application file for complete search history.

(56) References Cited

U.S. PATENT DOCUMENTS

2015/0208443 A1\* 7/2015 Jung .................... H04B 7/0617
370/329
2019/0223214 A1\* 7/2019 Jiang .................. H04L 27/2666

FOREIGN PATENT DOCUMENTS

CN 101547510 A 9/2009
CN 101919297 A 12/2010
(Continued)

OTHER PUBLICATIONS

European Patent Office, Extended European Search Report dated Oct. 27, 2020 for EP18748397.9.
(Continued)

*Primary Examiner* — Christine T Duong
(74) *Attorney, Agent, or Firm* — Li & Cai Intellectual Property (USA) Office (57) ABSTRACT

A method for indicating a random access resource, comprises: determining a first correspondence relationship between a downlink signal and a random access resource or a second correspondence relationship between a downlink channel and a random access resource; sending the first correspondence relationship and the downlink signal to a terminal if the first correspondence relationship is determined, wherein the first correspondence relationship and the downlink signal are used by the terminal to determine the random access resource; and sending the second correspondence relationship and the downlink channel to the terminal if the second correspondence relationship is determined, wherein the second correspondence relationship and the downlink channel are used by the terminal to determine the random access resource. Also disclosed in an embodiment of the present disclosure are a base station and a terminal.

20 Claims, 5 Drawing Sheets

(56) References Cited

FOREIGN PATENT DOCUMENTS

| CN | 102291844 A | 12/2011 |
|----|----|----|
| CN | 103491633 A | 1/2014 |
| CN | 103974445 A | 8/2014 |
| CN | 105722095 A | 6/2016 |
| CN | 105792380 A | 7/2016 |
| WO | WO 2016086144 A1 | 6/2016 |

OTHER PUBLICATIONS

Samsung, "RACH resource for MSG1 transmission" dated Nov. 13, 2016, 3GPP TSG RAN WG1 #87.
Nokia, et al., "RACH Resource Configuration for Single-Beam and Multi-Beam" dated Nov. 13, 2016, 3GPP TSG RAN WG1 #87.
ZTE Corporation, et al., "Random access preamble structure and signaling" dated Nov. 5, 2016, 3GPP TSG RAN WG1 #87.
Samsung, "NR 4-step random access procedure" dated Jan. 16, 2017, 3GPP TSG RAN WG1 NR AD HOC.
WIPO, International Search Report dated Mar. 20, 2018.

* cited by examiner

RANDOM ACCESS RESOURCE INDICATION METHOD, BASE STATION AND TERMINAL

FIELD OF THE INVENTION

The present disclosure relates to the field of wireless communication, and particularly relates to a method for indicating a random access resource, a base station and a terminal.

BACKGROUND

A new generation of mobile communication systems will be systematically networked on carrier frequencies higher than those used in existing 2G, 3G and 4G systems. Therefore, beam-forming technology is needed in the networking of the new generation of mobile communication systems to increase a coverage radius.

For the new generation of mobile communication systems where beam-forming is widely applied, none of the beams can completely cover the entire cell. Therefore, multiple beams are needed to cover the entire cell or a sector in the traditional sense. If the plurality of beams cannot be transmitted simultaneously, a process of beam scanning in the time dimension is required to cover the entire cell or sector. For downlink common signals (such as synchronization signals, etc.) or downlink channels (such as broadcast channels, common control channels, common traffic channels, etc.), beams are needed to ensure seamless coverage of the entire cell. Therefore, when a plurality of beams cannot be transmitted simultaneously, a complete beam scanning process is required to enable a terminal at any possible location of the cell to read the corresponding common signal or information. After the terminal reads the common signal or information, the terminal may initiate a random access according to random access resources informed by a random access configuration message carried in the common signal or information.

However, these random access resources are common resources of all beams, instead of a specific random access resource subset for a certain beam. Since these random access resources do not belong to a resource subset for a specific beam direction, a base station cannot determine a downlink beam selected by the terminal via a random access resource selected by the terminal.

SUMMARY

In this regard, there is provided in the embodiments of the present disclosure a method for indicating a random access resource, a base station and a terminal that enable the base station to determine a downlink beam selected by the terminal via a random access resource selected by the terminal.

Technical solutions in the embodiments of the present disclosure are implemented as follows.

A method for indicating a random access resource, includes: determining a first correspondence relationship between a downlink signal and a random access resource or a second correspondence relationship between a downlink channel and a random access resource; sending the first correspondence relationship and the downlink signal to a terminal if the first correspondence relationship is determined, wherein the terminal determines the random access resource by the first correspondence relationship and the downlink signal; and sending the second correspondence relationship and the downlink channel to the terminal if the second correspondence relationship is determined, wherein the terminal determines the random access resource by the second correspondence relationship and the downlink channel.

In the method as described above, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

In the method as described above, the second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

In the method as described above, when the first correspondence relationship is the first uniform correspondence relationship, the step of sending the first correspondence relationship and the downlink signal to the terminal if the first correspondence relationship is determined includes: sending the first correspondence relationship and the downlink signal to the terminal in a predefined manner or a broadcast message manner if the first uniform correspondence relationship is determined.

In the method as described above, when the second correspondence relationship is the second uniform correspondence relationship, the step of sending the second correspondence relationship and the downlink channel to the terminal if the second correspondence relationship is determined includes: sending the second correspondence relationship and the downlink channel to the terminal in a predefined manner or a broadcast message manner if the second uniform correspondence relationship is determined.

In the method as described above, the first correspondence relationship and the second correspondence relationship further include a one-to-one relation or a one-to-many relation or a many-to-one relation.

In the method as described above, the step of sending the first correspondence relationship and the downlink signal to the terminal if the first correspondence relationship is determined includes: sending all relations of the first correspondence relationship and the downlink signal to the terminal via a piece of first system information if the first correspondence relationship is determined; or sending preset part of relations of the first correspondence relationship and the downlink signal to the terminal via at least two pieces of second system information if the first correspondence relationship is determined, wherein the preset part of relations of the first correspondence relationship sent via each piece of the second system information is different.

In the method as described above, the step of sending the second correspondence relationship and the downlink channel to the terminal if the second correspondence relationship is determined includes: sending all relations of the second correspondence relationship and the downlink channel to the terminal via a piece of third system information if the second correspondence relationship is determined; or sending preset part of relations of the second correspondence relationship and the downlink channel to the terminal via at least two pieces of fourth system information if the second correspondence relationship is determined, wherein the preset part of relations of the second correspondence relationship sent via each piece of the fourth system information is different.

The method as described above, further includes: repeatedly sending preset part of signals of the downlink signals to the terminal in the same period; or repeatedly sending preset part of channels of the downlink channels to the terminal in the same period.

In the method as described above, the step of repeatedly sending preset part of signals of the downlink signals to the terminal in the same period includes: repeatedly sending preset part of signals of the downlink signals of the same beam to the terminal in the same period; and the step of repeatedly sending preset part of channels of the downlink channels to the terminal in the same period includes: repeatedly sending preset part of channels of the downlink channels of the same beam to the terminal in the same period.

A method for indicating a random access resource, includes: receiving a first correspondence relationship and a downlink signal sent from a base station, wherein the first correspondence relationship is a correspondence relationship between a downlink signal and a random access resource determined by the base station, or receiving a second correspondence relationship and a downlink channel sent from the base station, wherein the second correspondence relationship is a correspondence relationship between a downlink channel and a random access resource determined by the base station; measuring, if the first correspondence relationship and the downlink signal are received, a quality of the downlink signal, and determining the random access resource according to the first correspondence relationship and the quality of the downlink signal; and measuring, if the second correspondence relationship and the downlink channel are received, a quality of the downlink channel, and determining the random access resource according to the second correspondence relationship and the quality of the downlink channel.

In the method as described above, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

In the method as described above, the second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

In the method as described above, the first correspondence relationship and the second correspondence relationship further include a one-to-one relation or a one-to-many relation or a many-to-one relation.

In the method as described above, the step of receiving the first correspondence relationship and the downlink signal sent from the base station includes: receiving all relations of the first correspondence relationship and the downlink signal sent from the base station via a piece of first system information; or receiving preset part of relations of the first correspondence relationship and the downlink signal sent from the base station via at least two pieces of second system information, wherein the preset part of relations of the first correspondence relationship sent via each piece of the second system information is different.

In the method as described above, the step of receiving the second correspondence relationship and the downlink channel sent from the base station includes: receiving all relations of the second correspondence relationship and the downlink channel sent from the base station via a piece of third system information; or receiving preset part of relations of the second correspondence relationship and the downlink channel sent from the base station via at least two pieces of fourth system information; wherein the preset part of relations of the second correspondence relationship sent via each piece of the fourth system information is different.

The method as described above, further includes: repeatedly receiving preset part of signals of the downlink signals sent from the base station in the same period, or repeatedly receiving preset part of channels of the downlink channels sent from the base station in the same period.

In the method as described above, the step of repeatedly receiving preset part of signals of the downlink signals sent from the base station in the same period includes: repeatedly receiving preset part of signals of the downlink signals of the same beam sent from the base station in the same period, and the step of repeatedly receiving preset part of channels of the downlink channels sent from the base station in the same period includes: repeatedly receiving preset part of channels of the downlink channels of the same beam sent from the base station in the same period.

A base station, includes: a pre-processing module configured to determine a first correspondence relationship between a downlink signal and a random access resource or a second correspondence relationship between a downlink channel and a random access resource; a first sending module configured to send the first correspondence relationship and the downlink signal to a terminal if the first correspondence relationship is determined, wherein the terminal determines the random access resource by the first correspondence relationship and the downlink signal; a second sending module configured to send the second correspondence relationship and the downlink channel to the terminal if the second correspondence relationship is determined, wherein the second correspondence relationship and the downlink channel are used by the terminal to determine the random access resource.

In the base station as described above, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

In the base station as described above, the second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

In the base station as described above, when the first correspondence relationship is the first uniform correspondence relationship, the first sending module is configured to send the first correspondence relationship and the downlink signal to the terminal in a predefined manner or a broadcast message manner if the first uniform correspondence relationship is determined.

In the base station as described above, when the second correspondence relationship is the second uniform correspondence relationship, the second sending module is configured to send the second correspondence relationship and the downlink channel to the terminal in a predefined manner or a broadcast message manner if the second uniform correspondence relationship is determined.

In the base station as described above, the first correspondence relationship and the second correspondence relationship further include a one-to-one relation or a one-to-many relation or a many-to-one relation.

In the base station as described above, the first sending module is configured to send all relations of the first correspondence relationship and the downlink signal to the terminal via a piece of first system information if the first correspondence relationship is determined; or, send preset part of relations of the first correspondence relationship and the downlink signal to the terminal via at least two pieces of second system information if the first correspondence relationship is determined, wherein the preset part of relations of the first correspondence relationship sent via each piece of the second system information is different.

In the base station as described above, the second sending module is configured to send all relations of the second correspondence relationship and the downlink channel to the terminal via a piece of third system information if the second correspondence relationship is determined; or, send preset part of relations of the second correspondence relationship and the downlink channel to the terminal via at least two pieces of fourth system information if the second correspondence relationship is determined, wherein the preset part of relations of the second correspondence relationship sent via each piece of the fourth system information is different.

In the base station as described above, the first sending module is further configured to repeatedly send preset part of signals of the downlink signals to the terminal in the same period; the second sending module is further configured to repeatedly send preset part of channels of the downlink channels to the terminal in the same period.

In the base station as described above, the first sending module is further configured to repeatedly send preset part of signals of the downlink signals of the same beam to the terminal in the same period; the second sending module is further configured to repeatedly send preset part of channels of the downlink channels of the same beam to the terminal in the same period.

A terminal, includes: a receiving module configured to receive a first correspondence relationship and a downlink signal sent from a base station, wherein the first correspondence relationship is a correspondence relationship between a downlink signal and a random access resource determined by the base station, or, receive a second correspondence relationship and a downlink channel sent from the base station, wherein the second correspondence relationship is a correspondence relationship between a downlink channel and a random access resource determined by the base station; a first processing module configured to measure, if the first correspondence relationship and the downlink signal are received, a quality of the downlink signal, and determine the random access resource according to the first correspondence relationship and the quality of the downlink signal; and a second processing module configured to measure, if the second correspondence relationship and the downlink channel are received, a quality of the downlink channel, and determine the random access resource according to the second correspondence relationship and the quality of the downlink channel.

In the terminal as described above, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

In the terminal as described above, the second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

In the terminal as described above, the first correspondence relationship and the second correspondence relationship further include a one-to-one relation or a one-to-many relation or a many-to-one relation.

In the terminal as described above, the receiving module is configured to receive all relations of the first correspondence relationship and the downlink signal sent from the base station via a piece of first system information; or, receive preset part of relations of the first correspondence relationship and the downlink signal sent from the base station via at least two pieces of second system information, wherein the preset part of relations of the first correspondence relationship sent via each piece of the second system information is different.

In the terminal as described above, the receiving module is further configured to receive all relations of the second correspondence relationship and the downlink channel sent from the base station via a piece of third system information; or, receive preset part of relations of the second correspondence relationship and the downlink channel sent from the base station via at least two pieces of fourth system information; wherein the preset part of relations of the second correspondence relationship sent via each piece of the fourth system information is different.

In the terminal as described above, the receiving module is further configured to repeatedly receive preset part of signals of the downlink signals sent from the base station in the same period, or, repeatedly receive preset part of channels of the downlink channels sent from the base station in the same period.

In the terminal as described above, the receiving module is further configured to repeatedly receive preset part of signals of the downlink signals of the same beam sent from the base station in the same period, or, repeatedly receive preset part of channels of the downlink channels of the same beam sent from the base station in the same period.

According to the method for indicating a random access resource, the base station and the terminal provided in the embodiments of the present disclosure, the base station determines a first correspondence relationship between a downlink signal and a random access resource or a second correspondence relationship between a downlink channel and a random access resource, sends the first correspondence relationship and the downlink signal to the terminal if the first correspondence relationship is determined so that the terminal determines the random access resource, and sends the second correspondence relationship and the downlink channel to the terminal if the second correspondence relationship is determined so that the terminal determines the random access resource. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

DETAILED DESCRIPTION OF THE EMBODIMENTS

Figure 1:
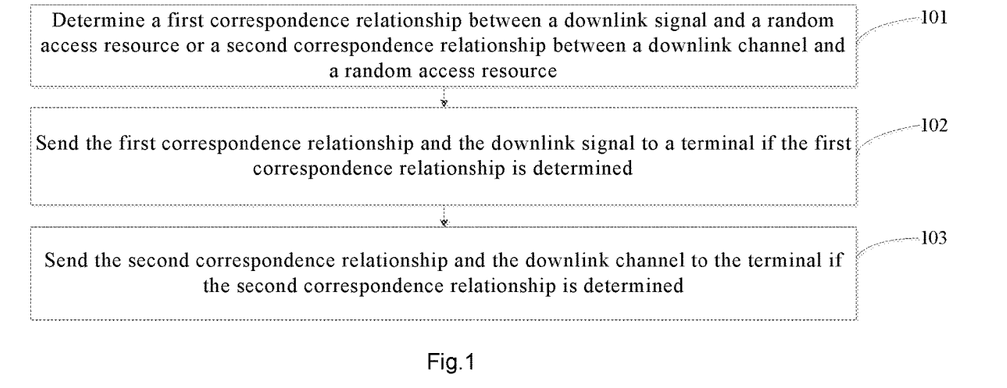
FIG. 1 is a schematic flowchart of a method for indicating a random access resource according to an embodiment of the present disclosure.

In an embodiment of the present disclosure, a method for indicating a random access resource is provided. As shown in FIG. 1, the method includes the following steps:

At step 101, a first correspondence relationship between a downlink signal and a random access resource or a second correspondence relationship between a downlink channel and a random access resource is determined.

Specifically, at the step 101, determining a first correspondence relationship between a downlink signal and a random access resource or a second correspondence relationship between a downlink channel and a random access resource may be implemented by a base station, or by a Transmission Reception Point (TRP) that has equivalent functions to a base station. The first correspondence relationship refers to a correspondence relationship between a downlink signal and a random access resource, and the second correspondence relationship refers to a correspondence relationship between a downlink channel and a random access resource. Only one of the first correspondence relationship and the second correspondence relationship needs to be determined.

At step 102, if the first correspondence relationship is determined, the first correspondence relationship and the downlink signal are sent to a terminal.

It should be noted that the first correspondence relationship and the downlink signal are used by the terminal to determine the random access resource.

Specifically, at the step 102, sending the first correspondence relationship and the downlink signal to a terminal if the first correspondence relationship is determined may be implemented by a base station, or by a TRP that has equivalent functions to a base station.

At step 103, if the second correspondence relationship is determined, the second correspondence relationship and the downlink channel are sent to the terminal.

It should be noted that the second correspondence relationship and the downlink channel are used by the terminal to determine the random access resource.

Specifically, at the step 103, sending the second correspondence relationship and the downlink channel to the terminal if the second correspondence relationship is determined may be implemented by a base station, or by a TRP that has equivalent functions to a base station.

According to the method for indicating a random access resource provided in the embodiment of the present disclosure, a first correspondence relationship between a downlink signal and a random access resource or a second correspondence relationship between a downlink channel and a random access resource is determined, and the first correspondence relationship and the downlink signal are sent to the terminal if the first correspondence relationship is determined so that the terminal determines the random access resource, and the second correspondence relationship and the downlink channel are sent to the terminal if the second correspondence relationship is determined so that the terminal determines the random access resource. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

Figure 2:
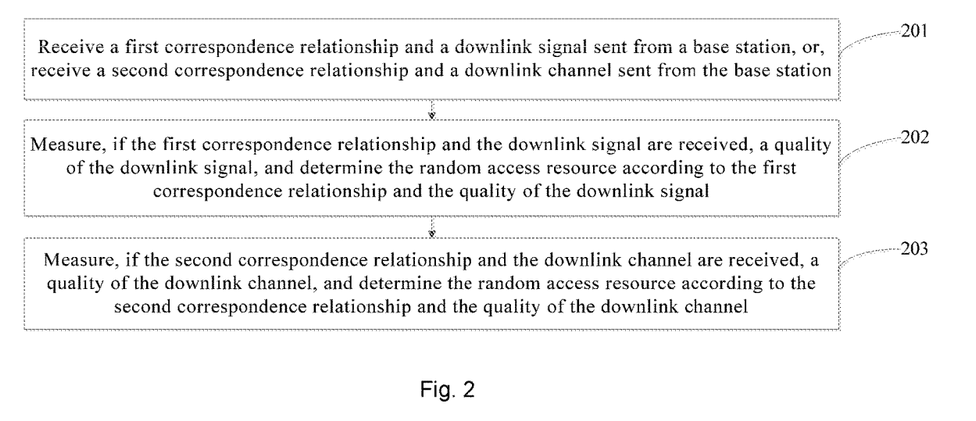
FIG. 2 is a schematic flowchart of another method for indicating a random access resource according to an embodiment of the present disclosure.

In an embodiment of the present disclosure, another method for indicating a random access resource is provided. As shown in FIG. 2, the method includes the following steps:

At step 201, a first correspondence relationship and a downlink signal sent from a base station are received, or, a second correspondence relationship and a downlink channel sent from the base station are received.

It should be noted that the first correspondence relationship is a correspondence relationship between a downlink signal and a random access resource determined by the base station; and the second correspondence relationship is a correspondence relationship between a downlink channel and a random access resource determined by the base station.

Specifically, at the step 201, receiving a first correspondence relationship and a downlink signal sent from a base station, or, receiving a second correspondence relationship and a downlink channel sent from the base station, may be implemented by a terminal.

At step 202, if the first correspondence relationship and the downlink signal are received, a quality of the downlink signal is measured, and a random access resource is determined according to the first correspondence relationship and the quality of the downlink signal.

Specifically, at the step 202, measuring, if the first correspondence relationship and the downlink signal are received, a quality of the downlink signal, and determining the random access resource according to the first correspondence relationship and the quality of the downlink signal may be implemented by a terminal. After receiving a plurality of downlink signals, the quality of the downlink signals is measured. Then, a downlink signal with better signal quality is selected for receiving, and a random access resource of the selected downlink signal is determined in the first correspondence relationship according to the selected downlink signal.

At step 203, if the second correspondence relationship and the downlink channel are received, a quality of the downlink channel is measured, and a random access resource is determined according to the second correspondence relationship and the quality of the downlink channel.

Specifically, at the step 203, measuring, if the second correspondence relationship and the downlink channel are received, a quality of the downlink channel, and determining the random access resource according to the second correspondence relationship and the quality of the downlink channel may be implemented by a terminal. After receiving a plurality of downlink channels, the quality of the downlink channels is measured. Then, a downlink channel with better channel quality is selected for receiving, and a random access resource of the selected downlink channel is determined in the second correspondence relationship according to the selected downlink channel.

According to the method for indicating a random access resource provided in the embodiment of the present disclosure, a first correspondence relationship and a downlink signal sent from a base station are received, or, a second correspondence relationship and a downlink channel sent from the base station are received; if the first correspondence relationship and the downlink signal are received, a quality of the downlink signal is measured, and a random access resource is determined according to the first correspondence relationship and the quality of the downlink signal; and if the second correspondence relationship and the downlink channel are received, a quality of the downlink channel is measured, and a random access resource is determined according to the second correspondence relationship and the quality of the downlink channel. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

Further, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

The second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

The first correspondence relationship and the second correspondence relationship further include a one-to-one relation or a one-to-many relation or a many-to-one relation, wherein the one-to-one relation in the first correspondence relationship means that each downlink signal corresponds to one random access resource or one unit capacity of random access resources, the one-to-many relation in the first correspondence relationship means that at least one downlink signal corresponds to at least two random access resources or two unit capacities of random access resources, the many-to-one relation in the first correspondence relationship means that at least two downlink signals correspond to one random access resource or one unit capacity of random access resources. The one-to-one, one-to-many, and many-to-one relations in the second correspondence relationship are similar to those in the first relation, and thus are not repeated herein.

Specifically, the simplest first uniform relation refers to a correspondence relationship of one-to-one mapping established between the downlink signals and the random access resources, where each random access resource has the same capacity. The simplest second uniform relation refers to a correspondence relationship of one-to-one mapping established between the downlink channels and the random access resources, where each random access resource has the same capacity. However, in the actual network operation, due to the geographically uneven distribution of users, terminals will be relatively concentrated in an area covered by some downlink beams at a certain moment. Accordingly, the random access resources of the downlink signals or downlink channels of these downlink beams are relatively tight. At this time, if the first correspondence relationship between the downlink signal and the random access resource is still a uniform correspondence relationship, or the second correspondence relationship between the downlink channel and the random access resource is still a uniform correspondence relationship, there will be a higher probability of collisions when the terminal performs a random access, resulting in a random access failure. At the same time, terminals will be relatively sparse in an area covered by some other downlink beams. Accordingly, the random access resources of the downlink signals or downlink channels of these downlink beams are relatively idle, resulting in waste of resources. Since a user is not fixed to a geographical location for a long time, the state in which terminals are unevenly distributed will change with the movement of the user. At another time, the original crowded resource may become idle, and the original idle resource may become tight. Different situations of the first correspondence relationship and the second correspondence relationship will now be specifically described below.

Figure 3:
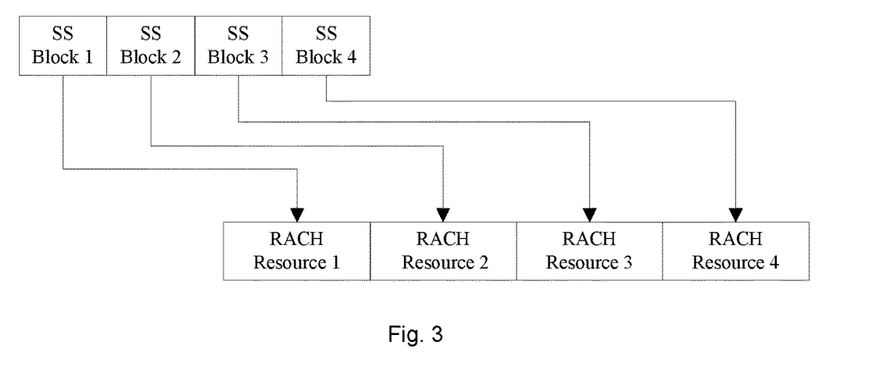
FIG. 3 is a schematic diagram illustrating establishing a uniform correspondence relationship between a downlink signal and a random access resource or between a downlink channel and a random access resource according to an embodiment of the present disclosure.

In the embodiments of the present disclosure, it is assumed that a certain block of resource that carries the downlink signal or the downlink channel is a synchronization signal block (SS Block) which is only a resource carrier and does not limit the functional characteristics of the carried corresponding downlink signal or channel. Each synchronization signal block corresponds to downlink signals or downlink channels of at least one specific beam direction. FIG. 3 is a schematic diagram illustrating establishing a uniform correspondence relationship between a downlink signal and a random access resource or between a downlink channel and a random access resource according to an embodiment of the present disclosure. As shown in FIG. 3, the synchronization signal blocks correspond to subsets of the Random Access Channel Resource (RACH Resource) one by one, where SS Block 1 corresponds to RACH Resource 1, SS Block 2 corresponds to RACH Resource 2, SS Block 3 corresponds to RACH Resource 3, SS Block 4 corresponds to RACH Resource 4, and SS Block 5 corresponds to RACH Resource 5.

Further, when the first correspondence relationship is the first uniform correspondence relationship, the step of sending the first correspondence relationship and the downlink signal to the terminal if the first correspondence relationship is determined includes: sending the first correspondence relationship and the downlink signal to the terminal in a predefined manner or a broadcast message manner if the first uniform correspondence relationship is determined.

When the second correspondence relationship is the second uniform correspondence relationship, the step of sending the second correspondence relationship and the downlink channel to the terminal if the second correspondence relationship is determined includes: sending the second correspondence relationship and the downlink channel to the terminal in a predefined manner or a broadcast message manner if the second uniform correspondence relationship is determined.

Specifically, in the process of sending to the terminal, one or more criteria may be set for all possible correspondence relationships, such as setting a time or frequency difference between the random access resource and the downlink signal, and setting a time or frequency difference between the random access resource and the downlink channel. If a time difference is set, the millisecond can be set to be a random access resource after a downlink signal or a downlink channel.

Specifically, the first uniform correspondence relationship also includes a case where multiple downlink signals correspond to one random access resource, or one downlink signal corresponds to multiple random access resources, but the quantity or capacity of the random access resource corresponding to each downlink signal is the same. The second uniform correspondence relationship also includes a case where multiple downlink channels correspond to one random access resource or one downlink channel corresponds to multiple random access resources, but the quantity or capacity of the random access resource corresponding to each downlink channel is the same. Since the downlink signals are uniformly correspond to the random access resources, and the downlink channels uniformly correspond the random access resources, in addition to the above-mentioned predefined manner and broadcast message manner, a global system broadcast channel manner may be used to send the first correspondence relationship and the downlink signal, or the second correspondence relationship and the downlink channel to the terminal, wherein a Physical Broadcast Channel (PBCH) is a typical global system broadcast channel. Compared to the predefined manner, sending through the global system broadcast channel enables modifications or adjustments of the sent content to be proceeded in a relatively long period of time (for example, days, or months). Therefore, this manner has a certain degree of flexibility, but is not suitable for dynamic or semi-static (e.g., in a cycle of seconds) flexible modifications.

Figure 4:
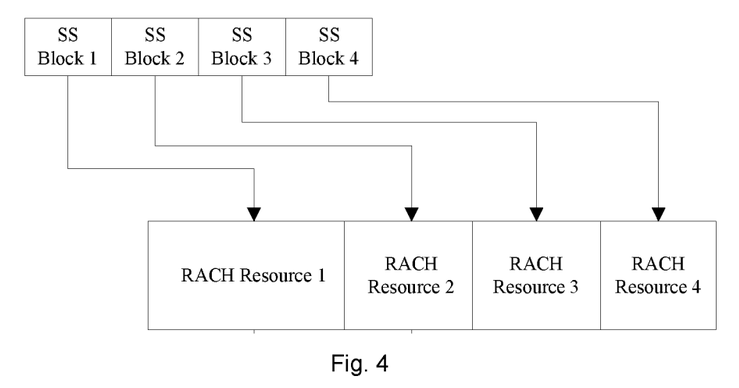
FIG. 4 is a schematic diagram illustrating establishing a non-uniform correspondence relationship between a downlink signal and a random access resource or between a downlink channel and a random access resource according to an embodiment of the present disclosure.
Figure 5:
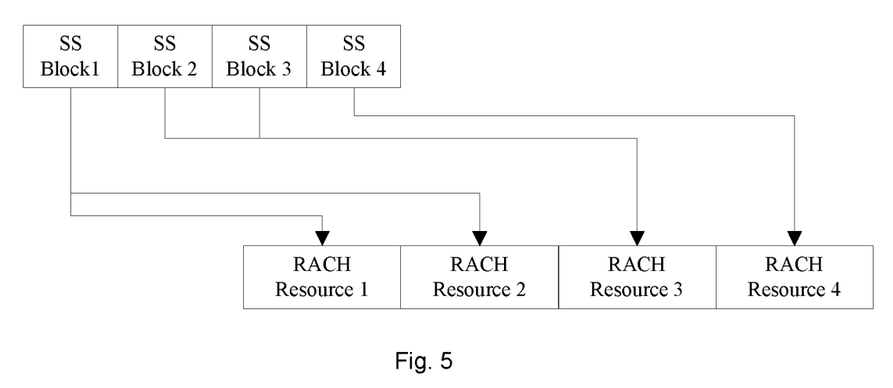
FIG. 5 is another schematic diagram illustrating establishing a non-uniform correspondence relationship between a downlink signal and a random access resource or between a downlink channel and a random access resource according to an embodiment of the present disclosure.

FIG. 4 is a schematic diagram illustrating establishing a non-uniform correspondence relationship between a downlink signal and a random access resource or between a downlink channel and a random access resource according to an embodiment of the present disclosure, and FIG. 5 is another schematic diagram illustrating establishing a non-uniform correspondence relationship between a downlink signal and a random access resource or between a downlink channel and a random access resource according to an embodiment of the present disclosure. In a beam with a relatively sparse terminal distribution, multiple synchronization signal blocks may correspond to one random access resource subset, or one synchronization signal block may correspond to a smaller random access subset. However, in a beam with a relatively dense terminal distribution, one synchronization signal block may correspond to a larger random access subset, or may correspond to multiple random access subsets. As shown in FIG. 4, SS Block 1 corresponds to the largest random access subset, that is, RACH Resource 1, SS Block 4 corresponds to the smallest random access subset, that is, RACH Resource 4, and SS Block 2 and SS Block 3 respectively correspond to a random access subset of a middle size, that is, RACH Resource 2 and RACH Resource 3. Assume that the random access subsets in FIG. 4 are standard random access subsets (with a fixed size), as shown in FIG. 4, SS Block 1 corresponds to two standard random access subsets, that is, RACH Resource 1 and RACH Resource 2, SS Block 2 and SS Block 3 correspond to one standard random access subset, that is, RACH Resource 3, and SS Block 4 corresponds to one standard random access subset, that is, RACH Resource 4.

The two schematic diagrams of FIGS. 4 and 5 represent possible mapping modes of the non-uniform correspondence relationship. Generally speaking, the non-uniform correspondence relationship means that one part of downlink signals or downlink channels correspond to more random access resources, while the other part of downlink signals or downlink channels correspond to fewer random access resources. With such non-uniform correspondence relationship, the base station is further required to perform semi-static or dynamic adjustments during system operation according to the change in geographical distribution of the terminal. Obviously, such a flexible correspondence relationship cannot be sent to the terminal in a predefined manner, but can be sent to the terminal through, for example, system information (SI) with a global nature.

Further, at step 102, the step of sending the first correspondence relationship and the downlink signal to the terminal if the first correspondence relationship is determined includes:

sending all relations of the first correspondence relationship and the downlink signal to the terminal via a piece of first system information if the first correspondence relationship is determined; or, sending preset part of relations of the first correspondence relationship and the downlink signal to the terminal via at least two pieces of second system information if the first correspondence relationship is determined, wherein the preset part of relations of the first correspondence relationship sent via each piece of the second system information is different.

At step 103, the step of sending the second correspondence relationship and the downlink channel to the terminal if the second correspondence relationship is determined includes:

sending all relations of the second correspondence relationship and the downlink channel to the terminal via a piece of third system information if the second correspondence relationship is determined; or, sending preset part of relations of the second correspondence relationship and the downlink channel to the terminal via at least two pieces of fourth system information if the second correspondence relationship is determined, wherein the preset part of relations of the second correspondence relationship sent via each piece of the fourth system information is different.

At step 201, the step of receiving the first correspondence relationship and the downlink signal sent from the base station includes:

receiving all relations of the first correspondence relationship and the downlink signal sent from the base station via a piece of first system information; or, receiving preset part of relations of the first correspondence relationship and the downlink signal sent from the base station via at least two pieces of second system information, wherein the preset part of relations of the first correspondence relationship sent via each piece of the second system information is different.

At step 201, the step of receiving the second correspondence relationship and the downlink channel sent from the base station includes:

receiving all relations of the second correspondence relationship and the downlink channel sent from the base station via a piece of third system information; or, receiving preset part of relations of the second correspondence relationship and the downlink channel sent from the base station via at least two pieces of fourth system information; wherein the preset part of relations of the second correspondence relationship sent via each piece of the fourth system information is different.

Figure 6:
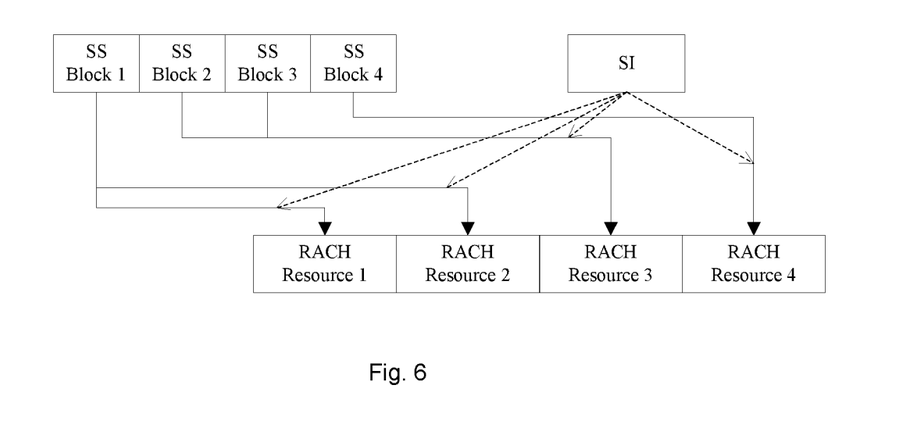
FIG. 6 is a schematic diagram illustrating sending all relations of a correspondence relationship by SI according to an embodiment of the present disclosure.

It should be noted that the preset part of relations of the first correspondence relationship and the preset part of relations of the second correspondence relationship are not fixed relations, but are relations that can be dynamically or semi-statically adjusted. FIG. 6 is a schematic diagram illustrating sending all relations of a correspondence relationship by SI according to an embodiment of the present disclosure. As shown in FIG. 6, SI includes all correspondence relationships between the downlink signals and the random access resources, or all correspondence relationships between the downlink channels and the random access resources. As indicated by the dotted lines in the figure, SI shows the terminal the random access resources corresponding to the respective synchronization signal blocks, that is, RACH Resource 1, RACH Resource 2, RACH Resource 3 and RACH Resource 4. This SI carries all the correspondence relationships, and thus can only be semi-statically adjusted within a relatively long period of time.

Although the sending method involved in the embodiment of FIG. 6 can send the non-uniform correspondence relationship with a certain degree of flexibility, ratios of the correspondence relationships are not uniform, which makes it difficult to compress the overhead occupied by various correspondence relationships carried by this system information, and causing a problem of a too large signaling overhead. Further, since the system information is carried by the beam, a beam scanning is required to cover the entire cell or sector. Then, the too large system information needs to be repeatedly sent in a time or frequency domain in a manner of beam scanning, which further increased the signaling overhead.

Figure 7:
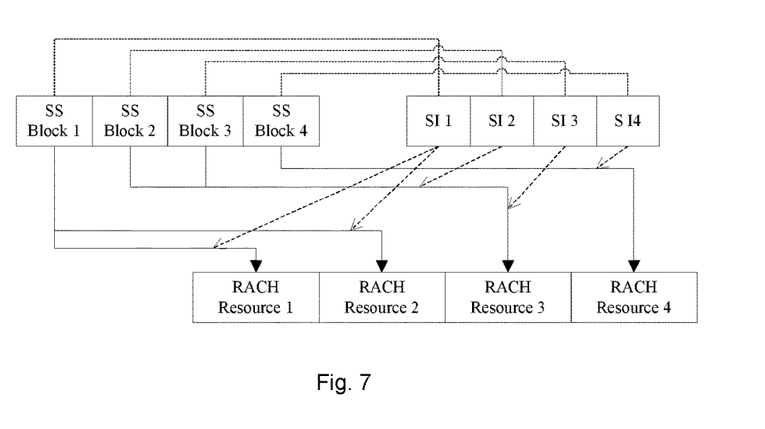
FIG. 7 is a schematic diagram illustrating sending preset part of relations of a correspondence relationship by SI according to an embodiment of the present disclosure.

Considering that the system information itself still needs a beam scanning in a multi-beam circumstance, and the beam carrying the system information is the same with the one carrying the downlink signal or the downlink channel (synchronization signal block), multiple pieces of system information can be sent, each of which does not need to carry all the correspondence relationships between the downlink signal or the downlink channel and the random access resource, but only the correspondence relationships between the downlink signal or the downlink channel and the random access resource of the same beam. FIG. 7 is a schematic diagram illustrating sending preset part of relations of a correspondence relationship by SI according to an embodiment of the present disclosure. Assume that SS Block 1, SS Block 2, SS Block 3, and SS Block 4 are respectively carried by four downlink beams, and the corresponding system information SI 1, SI 2, SI 3, and SI 4 are also carried by the same four downlink beams, then as shown in FIG. 7, part of the relations of the downlink beam carried by SI 1 is sent via the system information SI 1, part of the relations of the downlink beam carried by SI 2 is sent via SI 2, part of the relations of the downlink beam carried by SI 3 is sent via SI 3, and part of the relations of the downlink beam carried by SI 4 is sent via SI 4.

Figure 8:
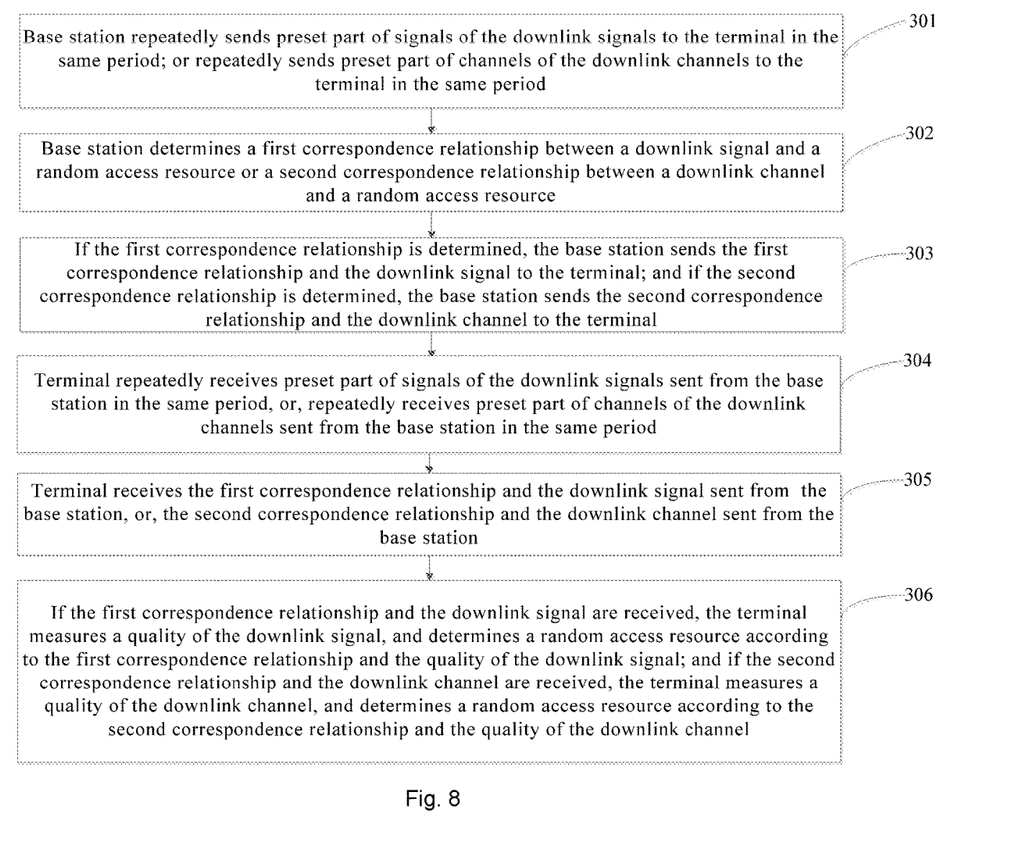
FIG. 8 is a schematic flowchart of yet another method for indicating a random access resource according to an embodiment of the present disclosure.

In an embodiment of the present disclosure, yet another method for indicating a random access resource is provided. As shown in FIG. 8, the method includes the following steps:

At step 301, a base station repeatedly sends preset part of signals of the downlink signals to the terminal in the same period; or repeatedly sends preset part of channels of the downlink channels to the terminal in the same period.

Specifically, the step of repeatedly sending preset part of signals of the downlink signals to the terminal in the same period includes: repeatedly sending preset part of signals of the downlink signals of the same beam to the terminal in the same period; the step of repeatedly sending preset part of channels of the downlink channels to the terminal in the same period includes: repeatedly sending preset part of channels of the downlink channels of the same beam to the terminal in the same period.

Specifically, in general, all downlink signals or downlink channels (synchronization signal blocks) in one period are non-repetitive. That is, each of the synchronization signal blocks has a beam direction different from each other, while each synchronization signal block itself has a uniform density. Therefore, the non-uniform correspondence relationship to the random access resource is mainly established by adjusting a density of the random access resource. If a density distribution of the random access resource is kept uniform, the non-uniform correspondence relationship between the downlink signal or the downlink channel and the random access resource can also be achieved by adjusting the density of the synchronization block.

Figure 9:
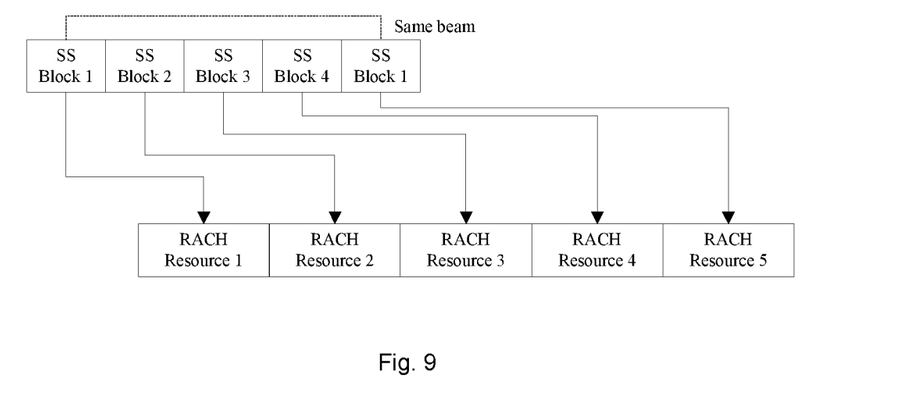
FIG. 9 is a schematic diagram illustrating repeatedly sending a downlink signal or a downlink channel according to an embodiment of the present disclosure.

FIG. 9 is a schematic diagram illustrating repeatedly sending a downlink signal or a downlink channel according to an embodiment of the present disclosure. As shown in FIG. 9, the base station repeatedly sends the downlink signal or downlink channel (synchronization signal block) in some beams with relatively dense terminals. Assume that a beam of SS Block 1 covers denser terminals, then SS Block 1 is repeatedly sent in one period. Here, SS Block 1, SS Block 2, SS Block 3, and SS Block 4 each refers to an index of a synchronization signal block, and the repeated SS Block 1 may be placed after all other SS Blocks, or after the first SS Block 1 or elsewhere. The correspondence relationship between the synchronization signal block and the random access resource is established based on an internal sequence of the synchronization signal blocks, that is, a uniform correspondence relationship to the random access resources is established according to a sequence of the synchronization signal blocks, which may be a one-to-one, or one-to-many uniform correspondence relationship.

Figure 10:
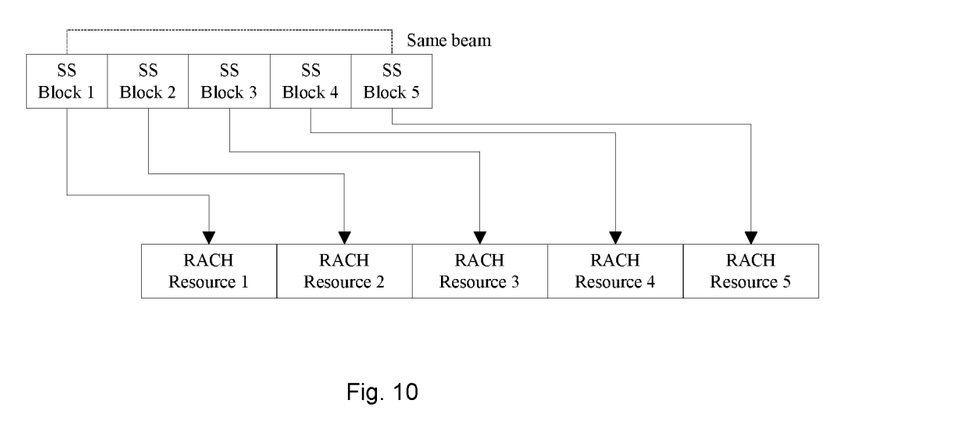
FIG. 10 is another schematic diagram illustrating repeatedly sending a downlink signal or a downlink channel according to an embodiment of the present disclosure.

FIG. 10 is another schematic diagram illustrating repeatedly sending a downlink signal or a downlink channel according to an embodiment of the present disclosure. As shown in FIG. 10, the base station repeatedly sends the beams in some beams of relatively dense terminals. Assume that a beam of SS Block 1 covers denser user terminals, then SS Block 5 is repeatedly emitted in one period. However, the downlink beam carried by SS Block 5 is the same as the downlink beam carried by SS Block 1, and the added SS Block 5 may be placed after all other SS blocks. Here, SS Block 1, SS Block 2, SS Block 3, SS Block 4, and SS Block 5 each refers to an index of a synchronization signal block.

At step 302, the base station determines a first correspondence relationship between a downlink signal and a random access resource or a second correspondence relationship between a downlink channel and a random access resource.

At step 303, if the first correspondence relationship is determined, the base station sends the first correspondence relationship and the downlink signal to the terminal; and if the second correspondence relationship is determined, the base station sends the second correspondence relationship and the downlink channel to the terminal.

At step 304, the terminal repeatedly receives preset part of signals of the downlink signals sent from the base station in the same period, or, repeatedly receives preset part of channels of the downlink channels sent from the base station in the same period.

Specifically, the step of repeatedly receiving preset part of signals of the downlink signals sent from the base station in the same period includes: repeatedly receiving preset part of signals of the downlink signals of the same beam sent from the base station in the same period; the step of repeatedly receiving preset part of channels of the downlink channels sent from the base station in the same period includes: repeatedly receiving preset part of channels of the downlink channels of the same beam sent from the base station in the same period.

At step 305, the terminal receives the first correspondence relationship and the downlink signal sent from the base station, or, the second correspondence relationship and the downlink channel sent from the base station.

At step 306, if the first correspondence relationship and the downlink signal are received, the terminal measures a quality of the downlink signal, and determines a random access resource according to the first correspondence relationship and the quality of the downlink signal; and if the second correspondence relationship and the downlink channel are received, the terminal measures a quality of the downlink channel, and determines a random access resource according to the second correspondence relationship and the quality of the downlink channel.

According to the method for indicating a random access resource provided in the embodiment of the present disclosure, a first correspondence relationship and a downlink signal sent from a base station is received, or, a second correspondence relationship and a downlink channel sent from the base station is received; if the first correspondence relationship and the downlink signal are received, a quality of the downlink signal is measured, and a random access resource is determined according to the first correspondence relationship and the quality of the downlink signal; and if the second correspondence relationship and the downlink channel are received, a quality of the downlink channel is measured, and a random access resource is determined according to the second correspondence relationship and the quality of the downlink channel. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

Figure 11:
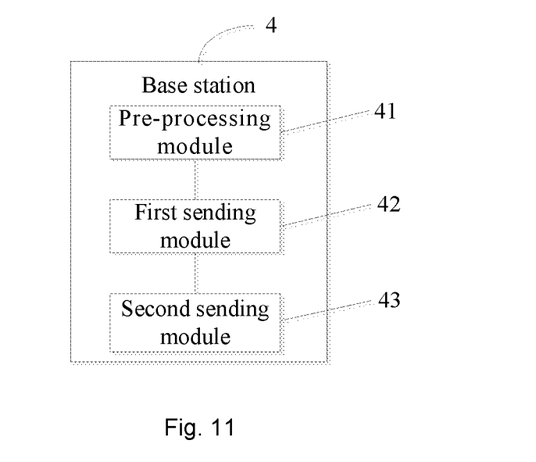
FIG. 11 is a schematic structural diagram of a base station according to an embodiment of the present disclosure.

In an embodiment the present disclosure, a base station is provided. As shown in FIG. 11, the base station 4 includes:

a pre-processing module 41 configured to determine a first correspondence relationship between a downlink signal and a random access resource or a second correspondence relationship between a downlink channel and a random access resource;

a first sending module 42 configured to send the first correspondence relationship and the downlink signal to a terminal if the first correspondence relationship is determined; wherein the first correspondence relationship and the downlink signal are used by the terminal to determine the random access resource; and a second sending module 43 configured to send the second correspondence relationship and the downlink channel to the terminal if the second correspondence relationship is determined; wherein the second correspondence relationship and the downlink channel are used by the terminal to determine the random access resource.

The base station provided in the embodiment of the present disclosure determines a first correspondence relationship between a downlink signal and a random access resource or a second correspondence relationship between a downlink channel and a random access resource, sends the first correspondence relationship and the downlink signal to the terminal if the first correspondence relationship is determined so that the terminal determines the random access resource, and sends the second correspondence relationship and the downlink channel to the terminal if the second correspondence relationship is determined so that the terminal determines the random access resource. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

Further, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

The second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

Further, when the first correspondence relationship is the first uniform correspondence relationship, the first sending module 42 is specifically configured to send the first correspondence relationship and the downlink signal to the terminal in a predefined manner or a broadcast message manner if the first uniform correspondence relationship is determined.

When the second correspondence relationship is the second uniform correspondence relationship, the second sending module 43 is specifically configured to send the second correspondence relationship and the downlink channel to the terminal in a predefined manner or a broadcast message manner if the second uniform correspondence relationship is determined.

Further, the first correspondence relationship and the second correspondence relationship further include a one-to-one relation or a one-to-many relation or a many-to-one relation.

Further, the first sending module 42 is specifically configured to send all relations of the first correspondence relationship and the downlink signal to the terminal via a piece of first system information if the first correspondence relationship is determined; or, send preset part of relations of the first correspondence relationship and the downlink signal to the terminal via at least two pieces of second system information if the first correspondence relationship is determined, wherein the preset part of relations of the first correspondence relationship sent via each piece of the second system information is different.

The second sending module 43 is specifically configured to send all relations of the second correspondence relationship and the downlink channel to the terminal via a piece of third system information if the second correspondence relationship is determined; or, send preset part of relations of the second correspondence relationship and the downlink channel to the terminal via at least two pieces of fourth system information if the second correspondence relationship is determined, wherein the preset part of relations of the second correspondence relationship sent via each piece of the fourth system information is different.

Further, the first sending module 42 is further configured to repeatedly send preset part of signals of the downlink signals to the terminal in the same period. The second sending module 43 is further configured to repeatedly send preset part of channels of the downlink channels to the terminal in the same period.

Further, the first sending module 42 is further configured to repeatedly send preset part of signals of the downlink signals of the same beam to the terminal in the same period. The second sending module 43 is further configured to repeatedly send preset part of channels of the downlink channels of the same beam to the terminal in the same period.

The base station provided in the embodiment of the present disclosure determines a first correspondence relationship between a downlink signal and a random access resource or a second correspondence relationship between a downlink channel and a random access resource, sends the first correspondence relationship and the downlink signal to the terminal if the first correspondence relationship is determined so that the terminal determines the random access resource, and sends the second correspondence relationship and the downlink channel to the terminal if the second correspondence relationship is determined so that the terminal determines the random access resource. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

In practical applications, the pre-processing module 41, the first sending module 42, and the second sending module 43 may each be implemented by a Central Processing Unit (CPU), a Micro Processor Unit (MPU), a Digital Signal Processor (DSP) or a Field Programmable Gate Array (FPGA) located in the base station.

Figure 12:
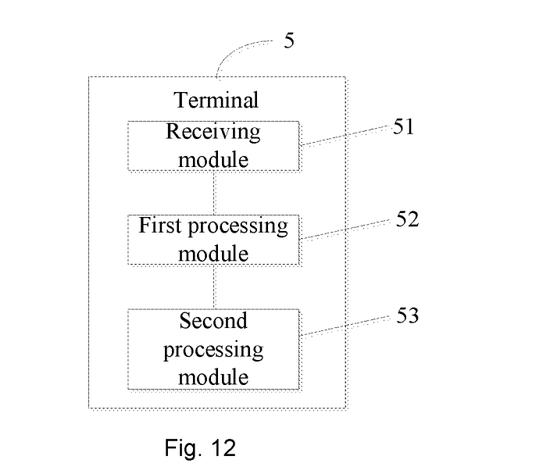
FIG. 12 is a schematic structural diagram of a terminal according to an embodiment of the present disclosure.

In an embodiment the present disclosure, a terminal is provided. As shown in FIG. 12, the terminal 5 includes:

a receiving module 51 configured to receive a first correspondence relationship and a downlink signal sent from a base station, wherein the first correspondence relationship is a correspondence relationship between a downlink signal and a random access resource determined by the base station; or, receive a second correspondence relationship and a downlink channel sent from the base station, wherein the second correspondence relationship is a correspondence relationship between a downlink channel and a random access resource determined by the base station;

a first processing module 52 configured to measure, if the first correspondence relationship and the downlink signal are received, a quality of the downlink signal, and determine the random access resource according to the first correspondence relationship and the quality of the downlink signal; and a second processing module 53 is configured to measure, if the second correspondence relationship and the downlink channel are received, a quality of the downlink channel, and determine the random access resource according to the second correspondence relationship and the quality of the downlink channel.

The terminal provided in the embodiment of the present disclosure receives a first correspondence relationship and a downlink signal sent from the base station, or, receives a second correspondence relationship and a downlink channel sent from the base station; measures, if the first correspondence relationship and the downlink signal are received, a quality of the downlink signal, and determines a random access resource according to the first correspondence relationship and the quality of the downlink signal; and measures, if the second correspondence relationship and the downlink channel are received, a quality of the downlink channel, and determines a random access resource according to the second correspondence relationship and the quality of the downlink channel. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

Further, the first correspondence relationship includes a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities.

The second correspondence relationship includes a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

Further, the first correspondence relationship and the second correspondence relationship further include a one-to-one relation or a one-to-many relation or a many-to-one relation.

Further, the receiving module 51 is specifically configured to receive all relations of the first correspondence relationship and the downlink signal sent from the base station via a piece of first system information; or, receive preset part of relations of the first correspondence relationship and the downlink signal sent from the base station via at least two pieces of second system information, wherein the preset part of relations of the first correspondence relationship sent via each piece of the second system information is different.

Further, the receiving module 51 is also specifically configured to receive all relations of the second correspondence relationship and the downlink channel sent from the base station via a piece of third system information, or, receive preset part of relations of the second correspondence relationship and the downlink channel sent from the base station via at least two pieces of fourth system information; wherein the preset part of relations of the second correspondence relationship sent via each piece of the fourth system information is different.

Further, the receiving module 51 is also configured to repeatedly receive preset part of signals of the downlink signals sent from the base station in the same period, or, repeatedly receive preset part of channels of the downlink channels sent from the base station in the same period.

Further, the receiving module 51 is also specifically configured to repeatedly receive preset part of signals of the downlink signals of the same beam sent from the base station in the same period, or, repeatedly receive preset part of channels of the downlink channels of the same beam sent from the base station in the same period.

The terminal provided in the embodiment of the present disclosure receives a first correspondence relationship and a downlink signal sent from the base station, or, receives a second correspondence relationship and a downlink channel sent from the base station; measures, if the first correspondence relationship and the downlink signal are received, a quality of the downlink signal, and determines a random access resource according to the first correspondence relationship and the quality of the downlink signal; and measures, if the second correspondence relationship and the downlink channel are received, a quality of the downlink channel, and determines a random access resource according to the second correspondence relationship and the quality of the downlink channel. By this way, the base station can determine the downlink signal that is selected and received by the terminal according to the random access resource selected by the terminal and the first correspondence relationship, or determine the downlink channel that is selected and received by the terminal according to the random access resource selected by the terminal and the second correspondence relationship. Since the downlink signal or the downlink channel belongs to a certain downlink beam, the base station can determine the downlink beam selected by the terminal according to the downlink signal or the downlink channel selected and received by the terminal, thereby finally achieving the object of determining the downlink beam selected by the terminal according to the random access resource selected by the terminal.

In practical applications, the receiving module 51, the first processing module 52, and the second processing module 53 can be implemented by a CPU, an MPU, a DSP, an FPGA, or the like located in the terminal.

Those skilled in the art will appreciate that embodiments of the present disclosure may be provided as a method, a system, or a computer program product. Accordingly, the present disclosure may take the form of a hardware embodiment, a software embodiment, or a combination embodiment of software and hardware. Moreover, the present disclosure may take the form of a computer program product embodied on one or more computer-usable storage media (including but not limited to disk storage and optical storage, etc.) including a computer-usable program code.

The present disclosure has been described with reference to flowcharts and/or block diagrams of the methods, apparatus (systems), and computer program products according to the embodiments of the present disclosure. It should be understood that each flow and/or block in the flowcharts and/or block diagrams, as well as any combination of the flow and/or block in the flowcharts and/or block diagrams, may be implemented by computer program instructions. These computer program instructions may be provided to a general purpose computer, a special purpose computer, an embedded processor, or a processor of other programmable data processing apparatus, such that the instructions, which are executed via the processor of the computer or other programmable data processing apparatus, create means for implementing the functions specified in one or more flows of the flowchart and/or one or more blocks of the block diagram.

These computer program instructions may also be stored in a computer readable memory that can direct a computer or other programmable data processing apparatus to operate in a particular manner, such that the instructions stored in the computer readable memory produce an article of manufacture comprising an instruction means for implementing the functions specified in one or more flows of the flowchart and/or one or more blocks of the block diagram.

These computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions specified in one or more flows of the flowchart and/or one or more blocks of the block diagram.

The above are only preferred embodiments of the present disclosure and not intended to limit the scope of the present disclosure.

INDUSTRIAL APPLICABILITY

The present disclosure is applicable to the field of wireless communication, and is configured such that a base station determines a downlink beam selected by a terminal according to a downlink signal or downlink channel that is selected by the terminal, thereby finally realizing the object of determining a downlink beam selected by a terminal according to a random access resource selected by the terminal.

What is claimed is:

1. A method for indicating random access resource, comprising:
    determining a first correspondence relationship between a downlink signal and a random access resource or a second correspondence relationship between a downlink channel and the random access resource;
    sending the first correspondence relationship and the downlink signal to a terminal under the condition that the first correspondence relationship is determined, wherein a terminal determines the random access resource by the first correspondence relationship and the downlink signal;
    sending the second correspondence relationship and the downlink channel to the terminal under the condition that the second correspondence relationship is determined, wherein the terminal determines the random access resource by the second correspondence relationship and the downlink channel.

2. The method according to claim 1, wherein the first correspondence relationship comprises a first uniform correspondence relationship or a first non-uniform correspondence relationship;
    the first uniform correspondence relationship means that the random access resources corresponding to any two different downlink signals have the same quantity or capacity; and
    the first non-uniform correspondence relationship means that the random access resources corresponding to at least two different downlink signals have different quantities or capacities.

3. The method according to claim 1, wherein the second correspondence relationship comprises a second uniform correspondence relationship or a second non-uniform correspondence relationship;
    the second uniform correspondence relationship means that the random access resources corresponding to any two different downlink channels have the same quantity or capacity; and
    the second non-uniform correspondence relationship means that the random access resources corresponding to at least two different downlink channels have different quantities or capacities.

4. The method according to claim 2, wherein when the first correspondence relationship is the first uniform correspondence relationship, the step of sending the first correspondence relationship and the downlink signal to the terminal under the condition that the first correspondence relationship is determined comprises:
    sending the first correspondence relationship and the downlink signal to the terminal in a predefined manner or a broadcast message manner under the condition that the first uniform correspondence relationship is determined.

5. The method according to claim 3, wherein when the second correspondence relationship is the second uniform correspondence relationship, the step of sending the second correspondence relationship and the downlink channel to the terminal under the condition that the second correspondence relationship is determined comprises:
    sending the second correspondence relationship and the downlink channel to the terminal in a predefined manner or a broadcast message manner under the condition that the second uniform correspondence relationship is determined.

6. The method according to claim 1, wherein the first correspondence relationship and the second correspondence relationship further comprise a one-to-one relation or a one-to-many relation or a many-to-one relation.

7. The method according to claim 1, wherein the step of sending the first correspondence relationship and the downlink signal to the terminal under the condition that the first correspondence relationship is determined comprises:
sending all relations of the first correspondence relationship and the downlink signal to the terminal via a piece of first system information under the condition that the first correspondence relationship is determined; or
sending preset part of relations of the first correspondence relationship and the downlink signal to the terminal via at least two pieces of second system information if the first correspondence relationship is determined, wherein the preset part of relations of the first correspondence relationship sent via each piece of the second system information is different.

8. The method according to claim 1, wherein the step of sending the second correspondence relationship and the downlink channel to the terminal under the condition that the second correspondence relationship is determined comprises:
sending all relations of the second correspondence relationship and the downlink channel to the terminal via a piece of third system information under the condition that the second correspondence relationship is determined; or
sending preset part of relations of the second correspondence relationship and the downlink channel to the terminal via at least two pieces of fourth system information under the condition that the second correspondence relationship is determined, wherein the preset part of relations of the second correspondence relationship sent via each piece of the fourth system information is different.

9. The method according to claim 1, further comprising:
repeatedly sending preset part of signals of the downlink signals to the terminal in a same period; or
repeatedly sending preset part of channels of the downlink channels to the terminal in the same period.

10. The method according to claim 9, wherein the step of repeatedly sending preset part of signals of the downlink signals to the terminal in the same period comprises:
repeatedly sending preset part of signals of the downlink signals of the same beam to the terminal in the same period, and
the step of repeatedly sending preset part of channels of the downlink channels to the terminal in the same period comprises:
repeatedly sending preset part of channels of the downlink channels of the same beam to the terminal in the same period.

11. A method for indicating random access resource, comprising:
receiving a first correspondence relationship and a downlink signal sent from a base station, wherein the first correspondence relationship is a correspondence relationship between the downlink signal and a random access resource determined by the base station, or
receiving a second correspondence relationship and a downlink channel sent from the base station, wherein the second correspondence relationship is a correspondence relationship between the downlink channel and a random access resource determined by the base station;
measuring, under the condition that the first correspondence relationship and the downlink signal are received, a quality of the downlink signal, and determining the random access resource according to the first correspondence relationship and the quality of the downlink signal; and
measuring, under the condition that the second correspondence relationship and the downlink channel are received, a quality of the downlink channel, and determining the random access resource according to the second correspondence relationship and the quality of the downlink channel.

12. The method according to claim 11, wherein the first correspondence relationship comprises a first uniform correspondence relationship or a first non-uniform correspondence relationship;
the first uniform correspondence relationship means that the random access resources corresponding to any two different downlink signals have the same quantity or capacity; and
the first non-uniform correspondence relationship means that the random access resources corresponding to at least two different downlink signals have different quantities or capacities.

13. The method according to claim 11, wherein the second correspondence relationship comprises a second uniform correspondence relationship or a second non-uniform correspondence relationship;
the second uniform correspondence relationship means that the random access resources corresponding to any two different downlink channels have the same quantity or capacity; and
the second non-uniform correspondence relationship means that the random access resources corresponding to at least two different downlink channels have different quantities or capacities.

14. The method according to claim 11, wherein the first correspondence relationship and the second correspondence relationship further comprise a one-to-one relation or a one-to-many relation or a many-to-one relation.

15. The method according to claim 11, wherein the step of receiving the first correspondence relationship and the downlink signal sent from the base station comprises:
receiving all relations of the first correspondence relationship and the downlink signal sent from the base station via a piece of first system information; or
receiving preset part of relations of the first correspondence relationship and the downlink signal sent from the base station via at least two pieces of second system information, wherein the preset part of relations of the first correspondence relationship sent via each piece of the second system information is different.

16. The method according to claim 11, wherein the step of receiving the second correspondence relationship and the downlink channel sent from the base station comprises:
receiving all relations of the second correspondence relationship and the downlink channel sent from the base station via a piece of third system information; or
receiving preset part of relations of the second correspondence relationship and the downlink channel sent from the base station via at least two pieces of fourth system information, wherein the preset part of relations of the second correspondence relationship sent via each piece of the fourth system information is different.

17. The method according to claim 11, further comprising:

repeatedly receiving preset part of signals of the downlink signals sent from the base station in the same period, or repeatedly receiving preset part of channels of the downlink channels sent from the base station in the same period.

18. The method according to claim 17, wherein the step of repeatedly receiving preset part of signals of the downlink signals sent from the base station in the same period comprises:

repeatedly receiving preset part of signals of the downlink signals of the same beam sent from the base station in the same period, and the step of repeatedly receiving preset part of channels of the downlink channels sent from the base station in the same period comprises:

repeatedly receiving preset part of channels of the downlink channels of the same beam sent from the base station in the same period.

19. A base station, comprising:

a pre-processing circuit configured to determine a first correspondence relationship between a downlink signal and a random access resource or a second correspondence relationship between a downlink channel and a random access resource;

a first sending circuit configured to send the first correspondence relationship and the downlink signal to a terminal under the condition that the first correspondence relationship is determined, wherein the terminal determines the random access resource by the first correspondence relationship and the downlink signal; and a second sending circuit configured to send the second correspondence relationship and the downlink channel to the terminal under the condition that the second correspondence relationship is determined, wherein the terminal determines the random access resource by the second correspondence relationship and the downlink channel, wherein the first correspondence relationship comprises a first uniform correspondence relationship or a first non-uniform correspondence relationship; the first uniform correspondence relationship means that the random access resources corresponding to any two different downlink signals have the same quantity or capacity; and the first non-uniform correspondence relationship means that the random access resources corresponding to at least two different downlink signals have different quantities or capacities, and wherein the second correspondence relationship comprises a second uniform correspondence relationship or a second non-uniform correspondence relationship; the second uniform correspondence relationship means that the random access resources corresponding to any two different downlink channels have the same quantity or capacity; and the second non-uniform correspondence relationship means that the random access resources corresponding to at least two different downlink channels have different quantities or capacities.

20. A terminal, comprising:

a receiving circuit configured to receive a first correspondence relationship and a downlink signal sent from the base station according to claim 19, wherein the first correspondence relationship is a correspondence relationship between a downlink signal and a random access resource determined by the base station, or receive a second correspondence relationship and a downlink channel sent from the base station, wherein the second correspondence relationship is a correspondence relationship between a downlink channel and a random access resource determined by the base station;

a first processing circuit configured to measure, under the condition that the first correspondence relationship and the downlink signal are received, a quality of the downlink signal, and determine the random access resource according to the first correspondence relationship and the quality of the downlink signal; and a second processing circuit configured to measure, under the condition that the second correspondence relationship and the downlink channel are received, a quality of the downlink channel, and determine the random access resource according to the second correspondence relationship and the quality of the downlink channel.

* * * * *